United States Patent [19]

Hennessy et al.

[11] Patent Number: 5,242,036
[45] Date of Patent: Sep. 7, 1993

[54] TORQUE AND/OR ROTATIONAL CONTROL APPARATUS

[75] Inventors: David R. Hennessy, Minneapolis; James P. LeClaire, St. Paul; James V. Radomski, New Brighton; Richard G. Christensen, Brooklyn Park, all of Minn.

[73] Assignee: Horton Manufacturing Co., Inc., Minneapolis, Minn.

[21] Appl. No.: 749,046
[22] Filed: Aug. 16, 1991
[51] Int. Cl.$^5$ .................. F16D 55/2265; F16D 65/12; F16D 65/847
[52] U.S. Cl. .................. 188/71.6; 188/73.32; 188/218 XL; 188/264 AA; 192/70.12; 192/70.13
[58] Field of Search .......... 188/71.1, 218 XL, 264 R, 188/264 A, 264 AA, 71.6, 73.31, 73.32; 192/70.12, 70.13, 88 A, 85 AA, 113 A, DIG. 1

[56] References Cited

U.S. PATENT DOCUMENTS

| 2,115,763 | 5/1938 | Burke ................. 192/113 A |
| 2,627,325 | 2/1953 | Helsten ............... 188/218 XL |
| 3,119,468 | 1/1964 | Mossey ................ 188/72.5 |
| 3,263,783 | 8/1966 | Sataruk ............... 192/113 A X |
| 3,285,371 | 11/1966 | Cadiou ............... 188/73.32 |
| 3,298,476 | 1/1967 | Day .................. 188/264 AA X |
| 3,394,780 | 7/1968 | Hodkinson ........... 188/218 XL |
| 3,805,935 | 4/1974 | Armstrong ........... 192/113 A |
| 3,899,054 | 8/1975 | Huntress et al. ..... 188/218 XL |
| 3,942,827 | 3/1976 | Warlop et al. ....... 188/73.32 X |
| 4,013,146 | 3/1977 | Gebhardt et al. .... 188/71.6 |
| 4,222,465 | 9/1980 | Haraikawa et al. .. 188/73.34 |
| 4,289,216 | 9/1981 | Shirai et al. ......... 188/72.2 |
| 4,392,559 | 7/1983 | Oshima ............... 188/73.32 |
| 4,474,268 | 10/1984 | Dayen ................ 188/71.5 |
| 4,535,873 | 8/1985 | Airheart ............. 188/73.32 X |
| 4,830,160 | 5/1989 | Marshall ............. 192/70.12 |

FOREIGN PATENT DOCUMENTS

| 1244834 | 7/1967 | Fed. Rep. of Germany ...... 188/218 XL |
| 1575813 | 1/1970 | Fed. Rep. of Germany . |
| 2406133 | 2/1974 | Fed. Rep. of Germany ...... 108/218 XL |
| 3107025 | 2/1982 | Fed. Rep. of Germany . |
| 3740311 | 6/1989 | Fed. Rep. of Germany . |
| 4003732 | 8/1991 | Fed. Rep. of Germany . |
| 1326205 | 3/1963 | France .................. 188/218 XL |
| 1562996 | 3/1969 | France .................. 188/218 XL |
| 11741 | 1/1985 | Japan .................. 188/71.6 |
| 1096633 | 12/1967 | United Kingdom . |
| 1371158 | 10/1974 | United Kingdom . |
| 1399855 | 7/1975 | United Kingdom . |
| 1421952 | 1/1976 | United Kingdom ......... 188/218 XL |
| 2024966 | 1/1980 | United Kingdom ......... 188/218 XL |

OTHER PUBLICATIONS

Tension Control Clutches and Brakes, Horton Manufacturing Co. Inc, Form No. L-21214-K-0190, Copyright 1990.

Primary Examiner—Robert J. Oberleitner
Assistant Examiner—Alfred Muratori
Attorney, Agent, or Firm—Peterson, Wicks, Nemer & Kamrath

[57] ABSTRACT

A torque and/or rotational control apparatus is disclosed in a preferred form of a brake (10) including a plurality of pairs of actuators (18) positioned on opposite sides of a friction disc (16) by spacers (120) having tear shaped cross sections. The pads (32) of the actuators (18) are removably held by a slideable locking pin (70) biased by a spring (80) into an aperture (68) of a backing plate (62) for the pad (32). A notch (64) formed in the pad (32) and the backing plate (62) is slideably received on a rail (66) axially extending from the housing (35) of the actuator (18) to prevent rotation about the locking pin (70). The friction disc (16) includes elongated and shortened fins (42, 43) upstanding between and equally circumferentially spaced intermediate first and second component discs (40, 41). The fins (42, 43) are free of circumferential interconnections to allow air to radially pass freely between the fins (42, 43). The elongated fins (42) extend generally tangentially from the inner edges of the component discs (40, 41). The spacers (120) are orientated with their lengths extending generally perpendicular to the fins (42, 43) and generally parallel to the air movement from between the component discs (40, 41). The shape and orientation of the spacers (120) promote laminar flow and reduce air turbulence to increase air flow around the spacers (120) and through the friction disc (16) and the brake (10).

22 Claims, 1 Drawing Sheet

TORQUE AND/OR ROTATIONAL CONTROL APPARATUS

BACKGROUND

The present invention relates generally to torque and/or rotational control apparatus such as clutches or brakes, and most particularly to replaceable pad mounting for clutches or brakes and to torque and/or rotational control apparatus having greatly increased heat dissipation.

It is a continuous problem to provide clutches or brakes which are efficient, have high ability to transfer the heat energy generated in the engagement process and/or in a constant slipping arrangement, and are easy to maintain and operate. U.S. Pat. No. 4,474,268 shows one type of apparatus designed to solve this problem and particularly is an external, multi-caliper brake arranged to provide controlled torque to a shaft including a hub arranged to be mounted to this shaft A longitudinally centrally located, internally finned friction disc is in turn mounted to the hub. The brake housing supports one or more brake cylinders or calipers, each of which in the most preferred form includes a fluid pressure actuated piston carrying a brake pad. The external calipers are fluid actuated to frictionally engage the friction disc and control the torque and/or rotation of the shaft. The multiplicity of calipers is for the intended purpose of broadening the range of torque and rotational control. It can then be appreciated that the capacity of the brake is dependent on the dissipation of heat which in turn is dependent upon air flow. The friction disc described provides increased cooling and increased brake efficiency by means of a finned arrangement. Specifically, the friction disc is formed of two, opposed, interlaced, finned portions to create a serpentine, radial and circumferential air cooling path for the friction disc and provide better heat transfer and increased brake efficiency. Although the apparatus of U.S. Pat. No. 4,474,268 showed a marked increase from prior apparatus in the ability to transfer the heat energy generated in the engagement process, further efforts were continued to improve capacity and efficiency including the utilization of cooling enhancing devices such as of the type taught in U.S. Pat. Nos. 4,561,522 and 4,846,315.

Thus, even with the development of apparatus having enhanced capabilities, the need and problem continue to provide apparatus with even greater ability to transfer the heat energy generated in the engagement process and/or in a constant slipping arrangement.

Similarly, although U.S. Pat. No. 4,474,268 shows a method for pad replacement that can be accomplished without the actual removal of any part of the apparatus to allow ease of maintenance, the need and problem continue to provide apparatus with even greater ease of pad replacement and without requiring the use of tools.

SUMMARY

The present invention solves these needs and other problems in the field of torque and/or rotational control by providing, in a preferred form, increased amount of air movement through the apparatus In a first preferred aspect, an improved interface disc is provided including elongated and shortened fins upstanding between and circumferentially spaced intermediate the inner surfaces of first and second component discs. All of the radially inner and outer ends of the elongated and shortened fins are free of circumferential interconnection to allow air to radially pass freely between the fins. The shortened fins are shorter than the elongated fins, with the radially inner ends of the shortened fins being spaced radially outwardly of the radially inner ends of the elongated fins. The elongated fins extend generally tangentially from the inner edges of the component discs.

In another preferred aspect, the spacers located between calipers of the apparatus have an elongated length relative to their width and are orientated with their lengths extending generally parallel to the air movement from the interface disc and, in the preferred form, generally perpendicular to the fins of the interface disc.

In yet a further preferred aspect, the spacers located between calipers of the apparatus have an elongated length relative to their width, with the width of the spacers decreasing along the length radially outward of the interface disc. In the preferred form, the cross section of the spacers are tear drop shaped.

In another preferred form, ease of pad replacement is allowed by providing a slideable pin biased into and for slideable receipt in an aperture located in the pad assembly, with the pad assembly including provisions for preventing rotation of the pad assembly about the pin.

It is then an object of the present invention to provide more efficient torque and/or rotational control apparatus.

It is a further object of the present invention to provide torque and/or rotational control apparatus having increased heat transfer characteristics.

It is a further object of the present invention to provide torque and/or rotational control apparatus which is more easily maintained.

It is a further object of the present invention to provide torque and/or rotational control apparatus allowing pad replacement without the use of tools.

It is a further object of the present invention to provide torque and/or rotational control apparatus which has increased overall efficiency.

It is a further object of the present invention to provide torque and/or rotational control apparatus which has increased overall cooling characteristics.

These and further objects and advantages of the present invention will become clearer in the light of the following detailed description of an illustrative embodiment of this invention described in connection with the drawings.

DESCRIPTION OF THE DRAWINGS

The illustrative embodiment of the present invention may best be described by reference to the accompanying drawings where.

Figure 2:
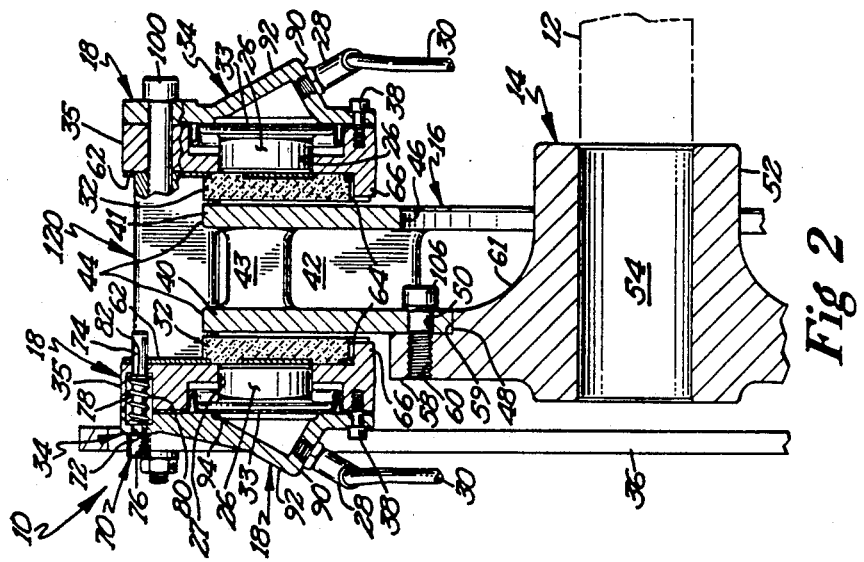
FIG. 2 is a partial, cross-sectional view of the brake of FIG. 1 according to section lines 2—2 of FIG. 1 with portions broken away to show internal constructions.
Figure 1:
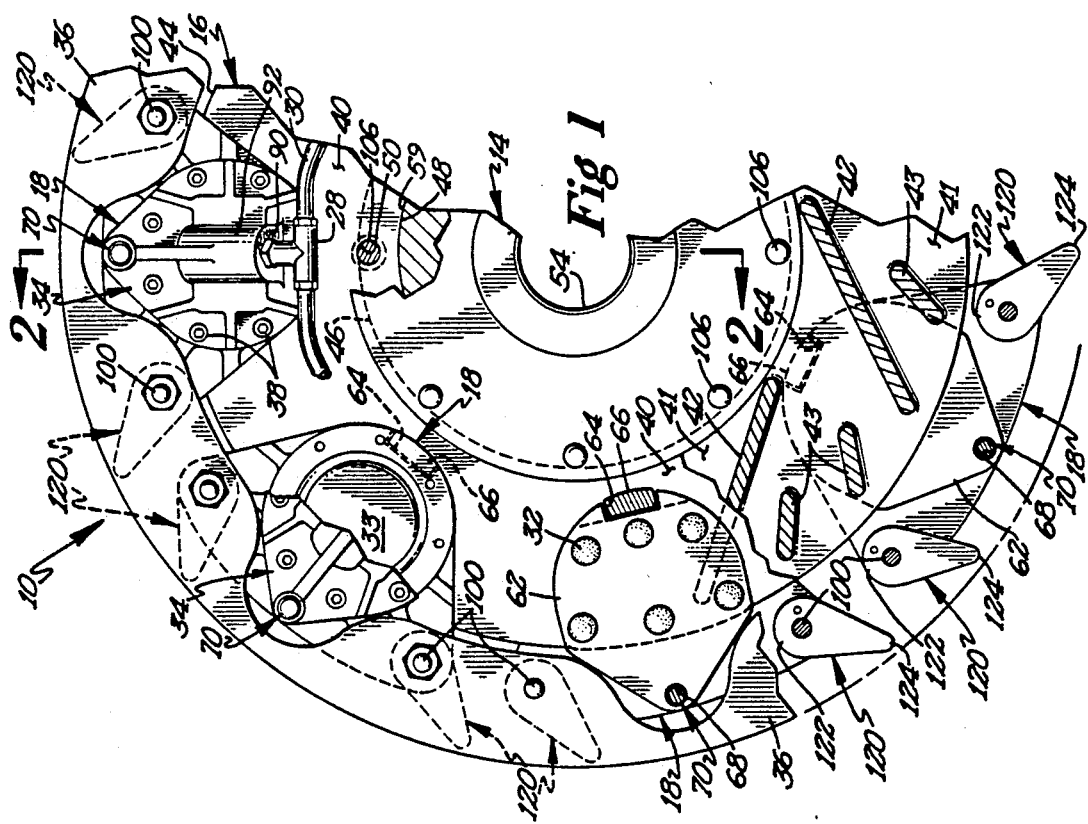
FIG. 1 is a partial, front elevational view of an external caliper brake constructed according to teachings of the present invention with portions being broken away to show internal constructions.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "end", "side", "radially", "axially", "inner", "outer", "outward", and similar terms are used herein, it should be understood that these terms have reference only to the structure shown in the drawings as it would appear to a person viewing the drawings and are utilized only to facilitate describing the invention.

DESCRIPTION

A torque and/or rotational control apparatus according to the preferred teachings of the present invention is shown in the drawings as an external caliper brake and is generally designated 10. Brake 10 includes the parts of: a member such as a shaft 12 to which braking force is desired to be applied and which is desired to be rotationally controlled; hub 14 forming part of the connection between brake 10 and shaft 12; an interface disc such as brake friction disc 16 connected to hub 14; and a plurality of external caliper type brake actuators or cylinders 18. Each brake cylinder 18 includes a piston 26, fluid fittings 28 of various configurations, fluid connections or air lines 30 of various lengths and configurations, and brake friction lining or brake pad 32. Pad 32 is engaged by a first face of piston 26 with the introduction of pressurized fluid (air in the preferred embodiment) into lines 30 by a conventional controlled source not shown, through fittings 28, against a diaphragm 33 on the opposite side of piston 26. Pad 32 frictionally engages against the braking surface of friction disc 16 and applies controlled frictional pressure to thereby apply braking power to shaft 12. It can then be recognized that brake 10 includes opposed but separated, frictionally engaged wear surfaces, with one of the wear surfaces being the piston 26 operated, replaceable brake pads 32 and the other wear surface being the opposed surface of brake friction disc 16.

More particularly, fluid (air) connections 30 are connected to fittings 28 which screw into bladder cylinder caps 34 which connect to cylinder housings 35 by means of screws or bolts 38 and which in turn are mounted to and form a part of an external housing 36 of brake 10 by means of a plurality of bolts 100. In the preferred form, cylinders 18 are constructed according to the teachings of U.S. Pat. No. 4,427,102, with diaphragm 33 captured and sandwiched between cap 34 and housing 35 and with piston 26 being piloted and supported in a bore 27 in housing 35.

As shown, housing 36 is in the form of a ring mounting the remaining parts. Brake 10 may then be conventionally mounted to or in a further housing, motor, or other environment to apply a braking force to or to rotationally control shaft 12 in a conventional manner. For example, bores, not shown, can be provided through housing 36 for receipt of mounting studs connected to the further housing, motor, or other environment.

With this background, the novel differences and subleties of the present invention over known prior brakes or clutches can be appreciated by those skilled in these technologies. One of such novel differences and subtleties of the present invention relates to the construction of bladder cylinder caps 34. Particularly, cap 34 includes an inclined wall 90 extending at an axially outward obtuse angle in the order of 120° from the radially inner portions of the outer face of cap 34. Fittings 28 are threadably received in wall 90. In the most preferred form, wall 90 is generally semicircular in shape. Cap 34 further includes an inclined semicylindrical portion 92 extending at an axially outward obtuse angle in the order of 150° from the radially outer portions of the outer face of cap 34 and integrally terminating in wall 90. The inner face of cap 34 includes a relatively large diameter and shallow bore 94. Bore 94 is generally axially in line with piston 26 and allows fluid such as air to circulate throughout the area of piston 26 when introduced through fittings 28 into portion 92.

It should then be noted that the angle of wall 90 similarly places fittings 28 at an angle to the outer face of cap 34 less than 90° and generally at an angle approaching being parallel to the outer face of cap 34. This reduces the axial space required in the installation of brake 10 according to the teachings of the present invention. Additionally, wall 90 and portion 92 are more efficient in drawing air over connections 30 as the air is drawn into and through friction disc 16. With increased air flow, connections 30 are less likely to become brittle or otherwise deteriorate from the heat generated from operation of brake 10.

Still further with regard to the overall assembly and this novel and subtle feature of brake 10 according to the present invention, a pinned brake pad connection assembly combines with the external calipers 18 and the internally positioned and finned brake disc 16 to allow a rapid and quite simple brake pad change, thus reducing replacement time, increasing brake utility, and allowing ease of maintenance.

Still further, the contribution of a diaphragm operated, external caliper type brake to the overall assembly of brake 10 has been found to provide a brake always ready to work by eliminating the disadvantage of a spring return working against the applied braking force. That is, with the diaphragm approach, a minimum gap will automatically be maintained between friction disc 16 and brake pads 32 by use of the air between these two moving surfaces and the differential effect of these two moving surfaces. A minimum gap is then maintained, and the brake is always ready to work with a high efficiency.

This combination, configuration, and overall assembly has been found to yield surprisingly and satisfyingly high braking efficiency and to allow a brake such as brake 10 according to the present invention which is easy and simple to maintain, allows rapid interchange of the wear parts, including the brake pads, provides increased efficiency, increased heat transfer characteristics, increased overall cooling characteristics, and greater heat dissipation.

With the foregoing explanation, the next novel feature and subtle difference of the present invention may be explained and understood by those skilled in the related technologies. This next feature is that the longitudinally centrally arranged friction disc 16 of the present invention is of a finned configuration. In particular, brake friction disc 16 in the embodiment shown is in the form of a single integral component including first and second, spaced, planar discs 40 and 41 having circumferentially spaced fins 42 and 43 projecting perpendicularly between and integrally connecting discs 40 and 41. Each disc 40 and 41 has an outer edge or periphery 44 and an inner circumference or edge 46. Adjacent the center of one of discs 40 and 41, adjacent inner edge 46 and in an integral ring of material 48 of the same thickness as and contiguous with discs 40 and 41, a plurality of mounting bores 50 are formed at regular circumferential intervals. In the most preferred form, disc 16 is cast with integral rings of material 48 on both discs 40 and 41, with ring of material 48 being machined off one of discs 40 and 41 and with bores 50 drilled in ring of material 48 in the other disc 40 or 41 depending upon the desired direction of rotation of friction disc 16.

Fins 42 are relatively thin and flat members upstanding between the inner surfaces of discs 40 and 41 and have a length greater than the radial length or distance between edges 44 and 46. In the preferred form, fins 42 are spaced and extend generally tangentially from edge 46 and in the most preferred form extend tangentially from a circle having a diameter larger than edge 46, with fins 42 extending generally 15° from a tangent to edge 46. Fins 42 have a length to extend to but spaced inwardly of edge 44. Fins 42 are equally circumferentially spaced around and between discs 40 and 41 and are free of circumferential interconnection to allow air to radially pass freely between circumferentially adjacent fins 42.

Fins 43 are relatively thin and flat members upstanding between discs 40 and 41 and have a length shorter than fins 42 and shorter than the radial length or distance between edges 44 and 46 and in the preferred form have a length approximately equal to three eighths or specifically 37.5% of the radial distance between edges 44 and 46 and approximately one quarter or specifically 28.6% of the length of fins 42. The thickness of fins 42 and 43 are equal. The radially outer ends of fins 43 are located at the same radial extent as the radially outer ends of fins 42. In the most preferred form, two fins 43 are equally circumferentially spaced between circumferentially adjacent fins 42. Thus, in the preferred form where eight fins 42 are provided circumferentially spaced 45° from each other, fins 43 extend at an angle 15° to each other and to the circumferentially adjacent fin 42. All of fins 43 are free of circumferentially interconnections with each other and with fins 42 to allow air to radially pass freely between circumferentially adjacent fins 42 and 43. In the preferred form, the radially inner edge of the first fin 43 circumferentially after the first of the pair of fins 42 between which fins 43 are located is radially in line with the radially inner edge of the other of the pair of fins 42 between which fins 43 are located. Further, in the preferred form, fins 43 have an equal length.

Hub 14 includes a generally cylindrical portion 52 having a centrally located bore 54 for slideable receipt upon shaft 12. Hub 14 further includes a radially extending flange 58 having a plurality of mounting bores 60 at regular circumferential intervals corresponding to bores 50 of friction disc 16. Hub 14 further includes a pilot shoulder 59 axially extending from flange 58 for slideable receipt of ring of material 48 of friction disc 16, with shoulder 59 having an axial extent generally equal to the thickness of disc 40 or 41. An arched or rounded portion 61 extends from shoulder 59 and the inner surface of disc 40 or 41 piloted on shoulder 59 to cylindrical portion 52. Friction disc 16 is connected to hub 14 by bolts 106 passing through bores 50 and threadably received in bores 60. It can then be appreciated that the orientation of fins 42 and 43 will be reversed if ring of material 48 is formed on disc 40 than if formed on disc 41.

It can further be appreciated that the member for which the torque and/or rotation is controlled being formed of two pieces, i.e., hub 14 and friction disc 16, is particularly advantageous. First, hub 14 can be positioned on shaft 12 permanently and friction disc 16 can be replaced when worn out without disturbing the position of hub 14 on shaft 12. This allows the user to easily remount friction disc 16 in position and eliminates costly set-up time. Further, hub 14 and friction disc 16 ca be made of different materials for greater efficiency of heat transfer to the air stream and allowing less heat to conduct into shaft 12. Also, a thermal insulator (such as a gasket) can be placed at the interface between hub 14 and friction disc 16 to further reduce the heat conducted to shaft 12.

With the foregoing explanation, the next novel feature and subtle difference of the present invention may be explained and understood by those skilled in these technologies, that of the pinned pad arrangement. Particularly, calipers or cylinders 18 each includes a pad assembly having a brake pad 32 secured to an enlarged backing plate 62, with backing plate 62 extending at least radially outwardly of brake pad 32. A radially extending notch 64 is formed in the radially inner edge of brake pad 32 and backing plate 62. The radially inner edge of cylinder housing 35 includes a rail 66 extending axially therefrom in a direction opposite to bladder cylinder cap 34 for slideable receipt within notch 64 of the pad assembly. An aperture 68 is formed in backing plate 62 radially outward of brake pad 32 for slideable receipt of a locking pin 70. Locking pin 70 in turn is slideable relative to cap 34 and housing 35 of calipers 18 generally parallel to and spaced from rail 66. Particularly, cap 34 and housing 35 include an axially extending through bore 72 of a size for slideable receipt of shank 74 of pin 70 but preventing passage of head 76 therethrough. Bore 72 includes an enlarged concentric counterbore 78 spaced from the outer surfaces of cap 34 and housing 35 and formed in one or both of cap 34 and housing 35. A spring 80 located within counterbore 78 and concentric to shank 74 of pin 70 abuts with and is captured between cap 34 and a snap ring 82 secured to shank 74 of pin 70 to bias pin 70 to slide axially inwardly from an axially outward position to an axially inward position.

It can now be appreciated that the replaceable brake pad 32 arrangement of the present invention is useable in various environments and devices including opposed but separated frictionally engaged wear surfaces, where at least one of the wear surfaces includes a replaceable pad, such as pad 32, mounted adjacent an opposed wear surface, such as friction disc 16.

It can then be appreciated that the pad assembly is captured by shank 74 of pin 70 extending through aperture 68 of backing plate 62, with rail 66 received in notch 64 preventing rotation of backing plate 62 about shank 74. The axial length of rail 66 and pin 70 is such that backing plate 62 is positioned thereon to the end of the stroke of piston 26 closest to friction disc 16 to then axially capture and position replaceable pad 32 between housing 35 and friction disc 16. Rail 66 must then be of an overall axial length just less than the distance between housing 35 and the opposed wear surface of friction disc 16, whereas due its radial positioning outside of friction disc 16, pin 70 has an overall length greater than the distance between housing 35 and the opposed wear surface of friction disc 16 to insure that pad 32 abuts with the opposed wear surface of friction disc 16 before backing plate 62 slides from shank 74 of pin 70 in its axially inward, biased position.

It can then be further appreciated that the change of replaceable brake pads 32 according to the present invention may be accomplished without the actual removal of any brake parts and without the use of tools. This is done by simply pulling on head 76 to thereby retract pin 70 against the bias of spring 80 to its axially outward position until the free end of shank 74 is pulled from aperture 68 of backing plate 62. At that time, backing plate 62 and pad 32 can be pulled by hand radially outwardly from between housing 35 and the opposed wear surface of friction disc 16. In similar fashion, a new pad assembly may be slipped between housing 35 and the opposed wear surface of friction disc 16 with notch 64 being radially received on rail 66. After positioning of aperture 68 in alignment with pin 70, pin 70 can be allowed to move axially inward under the bias of spring 80 to its axially inward position with shank 74 extending axially into and through aperture 68. It can then be appreciated that a pad change can be accomplished without the actual removal of any brake part of brake 10 and without the use of tools. Also, aside from the pad assembly itself, there is no loose parts such as nuts or bolts for the user to hold during pad replacement and which are subject to being misplaced during the pad change operation.

With the foregoing explanation, the next novel feature and subtle difference of the present invention may be explained and understood by those skilled in these technologies, that of the housing spacers 120 for locating first and second calipers 18 on opposite sides of friction disc 16. Particularly, spacers 120 in the preferred form are made of cast aluminum and have a tear drop cross section. Specifically, spacers 120 include a first portion 122 having a generally semicircular cross section and particularly having a circumferential extent slightly larger than a semicircle Spacers 120 further include a second portion 124 integrally formed with first portion 122 and having a cross section of a generally V-shape, with the sides of portion 124 extending generally tangentially and contiguously from the sides of portion 122. The junction of sides of portion 124 opposite portion 122 is rounded. The length of portion 124 from the junction of its sides to portion 122 is generally equal to one and one half times the diameter of portion 122 such that combined length of portions 122 and 124 is generally double the greatest width of spacer 120, i.e. the diameter of portion 122. Bolts 100 extend through apertures formed in caps 34 and housings 35 of first and second calipers 18 located on opposite sides of disc 16, through an aperture in housing 36 and through an aperture formed in spacer 120 at the diametric center of first portion 122, with spacer 120 located intermediate and sandwiched between housings 35 of said calipers 18.

Spacers 120 are orientated to have portions 124 extend radially outward from friction disc 16 and in the preferred form are orientated with their lengths extending generally perpendicular to and their widths extending parallel to the radial outer ends of fins 42 and 43 which in the preferred form is approximately 50° from the radial in the direction of rotation. Spacers 120 can be held in position by any suitable means such as by spring pins extending from housings 35 of calipers 18 spaced from bolt 100.

With the foregoing, further subleties and novel differences of brake 10 of the present invention can be explained and understood. Particularly, brake 10 provides a greatly increased amount of air to move through brake 10 than through comparable prior designs, with increased air resulting in greater heat dissipation, in turn resulting in greater apparatus capacity. Specifically, in its most preferred form, brake 10 includes a combination of unique features providing the synergistic enhancement of the amount of air which moves through brake 10. In regard to the preferred aspects of the present invention, the use of shortened fins 43 of a short length in comparison to the radial extent of discs 40 and 41 placed intermediate elongated fins 42 in comparison to the radial extent of discs 40 and 41 insures that air input between edges 46 of discs 40 and 41 is not physically blocked by the radially inner ends of fins 42 while still maximizing impeller surface area. Specifically, the radially inner ends of fins 42 are sufficiently circumferentially spaced from each other so as to not detrimentally physically obstruct air passage between discs 40 and 41 throughout the entire circumference but still provide impeller surface area for impeller efficiencies in drawing air between and through discs 40 and 41. Similarly, the radially outer ends of fins 42 and 43 provide impeller surface area for impeller efficiency in drawing air between and through discs 40 and 41.

Furthermore, as air includes both a radial component of movement as it travels radially between fins 42 and 43 and a circumferential component of movement due to the rotation of friction disc 16 secured to shaft 12, the orientation of fins 42 and 43 with respect to the radial enhances impeller efficiency.

Similarly, the smooth transition provided by rounded portion 61 from cylindrical portion 52 of hub 14 to between discs 40 and 41 enhances laminar air flow and reduces air turbulence to maximize air flow. In this regard, it can be appreciated that the machining of one of the rings of material 48 could be eliminated and mounting bores 50 drilled in both rings of material 48 to allow a single friction disc 16 to be rotated in either direction depending upon which disc 40 and 41 flange 58 of hub 14 was secured. However, this advantage is not capitalized upon in the most preferred form as the extra ring of material 48 decreases the available space between cylindrical portion 52 and arched portion 61 and thus partially obstructs air passage to friction disc 16.

Also, spacers 120 are shaped and orientated to enhance its aerodynamics and provide minimal obstruction to air flow. Particularly, the shape that is long when compared to its width and the generally rounded nature thereof promotes laminar flow and reduces air turbulence to increase air flow around spacers 120. Also, the feature of the width of spacers 120 decreasing along the length and in the preferred form of a tear drop shape promotes laminar flow and reduces air turbulence to increase air flow around spacers 120. Further, as air leaving friction disc 16 will have both radial and circumferential movement components, spacers 120 are orientated with their lengths generally parallel to the air flow and their widths generally perpendicular to the air flow leaving disc 16. Non-parallel orientations present larger obstructions promoting turbulence whereas parallel orientations promote laminar flow and reduce air turbulence. The relationship between the orientation of spacers 120 and fins 42 and 43 of friction disc 16 of the preferred form is believed to be advantageous in promoting laminar flow and reducing air turbulence to increase air flow through brake 10.

Now that the basic teachings of the present invention have been explained, many extensions and variations will be obvious to one having ordinary skill in the related technologies. For example, although the present invention has been explained with respect to a brake, it should be appreciated that the teachings apply to other types of torque and/or rotational apparatus such as but not limited to clutches. That is, the present invention applies to devices for providing rotational control between first members and second members, with at least the first member being rotatable about an axis. In the brake described, the first and second members may comprise the shaft 12 and brake housing 36. Generally, however, all that is necessary is that one member include a friction disc, such as friction disc 16, for controlled, selective contact with a friction engagement surface on another member, such as pads 32. It will then be recognized that a friction disc could be a frictional member of a clutch and the other friction engagement surface be the clutch pads.

Further, although the present invention has been described with respect to a shaft to be rotationally controlled, it is now clear that the present invention is general in application and therefore provides rotational control between various members, including shafts and hubs, or hubs and hubs, or hubs and shafts, or other like combinations, and it does not matter which is a stationary member and which is desired to be rotationally controlled with respect to the other.

Likewise, it should be appreciated that the teaching of the present invention are not restricted to the numbers of calipers 18 as shown.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. In an apparatus for controlling torque and/or rotation of a member, an improved interface disc comprising, in combination: first and second component discs having inner edges, outer edges, inner surfaces, and outer, interface surfaces; a plurality of elongated fins upstanding between the inner surfaces of the first and second component discs and having radially inner ends and radially outer ends, with the length between the radially inner ends and the radially outer ends of the elongated fins being greater than the radial length between the inner and outer edges of the component discs, with the elongated fins being equally circumferentially spaced and extending generally tangentially from the inner edges of the first and second components discs, with all of the radially inner and outer ends of the elongated fins being free of circumferential interconnection, with air being allowed to radially pass freely between circumferentially adjacent elongated fins between the inner and outer edges of the first and second component discs; at least a first, shortened fin equally circumferentially spaced between each pair of circumferentially adjacent elongated fins and upstanding between the inner surfaces of the first and second components discs and having radially inner ends and radially outer ends, with the length between the radially inner ends and the radially outer ends of the shortened fins being substantially shorter than the radial length between the inner and outer edges of the component discs and the length of the elongated fins, with all of the radially inner and outer ends of the shortened fins being free of circumferential interconnection; and means for interconnecting one of the first and second component discs to the member.

2. The interface disc of claim 1 further comprising, in combination: a second shortened fin, with the first and second shortened fins having the same length between the radially inner and outer ends, with the first and second shortened fins being equally circumferentially spaced between each other and between circumferentially adjacent elongated fins.

3. The interface disc of claim 2 wherein the radially inner ends of the elongated fins are located radially inward of the inner edge of the first and second component discs; and wherein the elongated fins are tangent to a circle of a diameter larger than the inner edges of the first and second component discs.

4. The interface disc of claim 3 wherein the diameter of the circle is less than the diameter of the radial extent of the radially inner ends of the elongated fins 5. The interface disc of claim 4 wherein the radially outer ends of the elongated and shortened fins are located at the same radial extent.

6. The interface disc of claim 5 wherein the length of the shortened fins is generally equal to one quarter the length of the elongated fins.

7. The interface disc of claim 1 wherein the interconnecting means comprises a ring of material integrally connected to one of the first and second component discs, with the ring of material having a thickness generally equal to and contiguous with the component disc; wherein the member comprises a hub including a generally cylindrical portion, a flange integrally extending radially from the cylindrical portion, a pilot shoulder integrally and axially extending from the flange and an arched portion integrally extending from the pilot shoulder to the cylindrical portion, with the pilot shoulder being of a size for slideable receipt of the ring of material and having an axial extent generally equal to the thickness of the ring of material; and wherein the interface disc further comprises, in combination: means for connecting the ring of material to the flange.

8. The interface disc of claim 1 wherein the apparatus further includes at least first and second calipers located on opposite sides of the outer, interface surfaces of the component discs, with the calipers including interface surfaces for selective contact with the outer, interface surfaces of the component discs.

9. The interface disc of claim 8 wherein the interface surfaces of the calipers comprise a pad assembly, and wherein the calipers further comprise, in combination: a pin; means for slideably mounting the pin for movement between an axially inward position and an axially outward position; means for biasing the pin from the axially outward position to the axially inward position; and an aperture located in the pad assembly for slideable receipt of the pin, with the pad assembly being removably held and captured by the pin slideably received in the aperture, with the pad assembly including means for preventing rotation of the pad assembly about the pin.

10. The interface disc of claim 9 wherein the calipers further comprise, in combination: a housing; and an axially extending rail extending from the housing generally parallel to and spaced from the pin; and wherein the rotation preventing means comprising a notch located in the pad assembly for slideable receipt upon the rail.

11. The interface disc of claim 10 wherein the calipers further comprise, in combination: a cap removably secured to the housing; wherein the pin comprises a shank and a head; wherein the slideably mounting means comprises a pin bore extending axially through the cap and the housing of a size for slideable receipt of the shank of the pin but preventing passage of the head of the pin; and wherein the biasing means comprises, in combination: a counterbore formed in at least one of the housing and the cap concentric to the pin bore; a spring located in the counterbore and concentric to the shank of the pin; and means on the shank of the pin for abutting with the spring and sandwiching the spring against the counterbore.

12. The interface disc of claim 8 wherein the apparatus further comprises, in combination: a spacer located radially outward of the outer edges of the component discs and extending between the first and second calipers; wherein the spacer has a length and a width, with the length of the spacer being greater than the width of the spacer, with the spacer being orientated with the length extending generally perpendicular to the elongated and shortened fins and the width extending generally parallel to the elongated and shortened fins.

13. The interface disc of claim 12 wherein the width of the spacer decreases along the length radially outward from the first and second component discs.

14. The interface disc of claim 13 wherein the cross section of the spacer is tear drop shaped and wherein the spacer comprises, in combination: a first portion having a generally semicircular cross section and having a circumferential extent slightly larger than a semicircle; and a second portion having a generally V-shaped cross section and extending tangentially and contiguously from the first portion.

15. The interface disc of claim 8 wherein the apparatus further comprises, in combination: a spacer located radially outward of the outer edges of the component discs and extending between the first and second calipers; wherein the cross section of the spacer is tear drop shaped and wherein the spacer comprises, in combination: a first portion having a generally semicircular cross section and having a circumferential extent slightly larger than a semicircle; and a second portion having a generally V-shaped cross section and extending tangentially and contiguously from the first portion.

16. The interface disc of claim 15 wherein the length of the cross section of the second portion is generally equal to one and one half times the diameter of the first portion.

17. In an apparatus for controlling the torque and/or rotation of an interface disc, with the interface disc including first and second spaced component discs having parallel, outer interface surfaces, with rotation of the disc causing air movement from between the component discs having both a radial component of movement and a circumferential component of movement, with the apparatus further including at least first and second calipers located on opposite sides of the interface surfaces of the interface disc, with the calipers including interface surfaces for interfacing with the interface surfaces of the interface disc, with the improvement comprising an improved spacer located radially outward of the interface disc and extending between the first and second calipers, with the spacer having a length and a width, with the width of the spacer decreasing along the length radially outward from the interface disc.

18. The spacer of claim 17 wherein the cross section of the spacer is tear drop shaped and wherein the spacer comprises, in combination: a first portion having a generally semicircular cross section and having a circumferential extent slightly larger than a semicircle; and a second portion having a generally V-shaped cross section and extending tangentially and contiguously from the first portion.

19. The spacer of claim 18 wherein the length of the cross section of the second portion is generally equal to one and one half times the diameter of the first portion.

20. The spacer of claim 19 wherein the spacer is orientated with the length generally parallel to the air movement from between the component discs and the width generally perpendicular to the air movement from between the component discs.

21. In an apparatus for controlling torque and/or rotation of an interface disc, with the interface disc including first and second spaced component discs having parallel, outer interface surfaces, with rotation of the disc causing air movement from between the component discs having both a radial component of movement and a circumferential component of movement, with the apparatus further including at least first and second calipers located on opposite sides of the interface surfaces of the interface disc, with the calipers including interface surfaces for interfacing with the interface surfaces of the interface disc, with the improvement comprising an improved spacer located radially outward of the interface disc and extending between the first and second calipers, with the spacer having a length and a width, with the spacer orientated with the length generally parallel to the air movement from between the component discs and the width generally perpendicular to the air movement from between the component discs.

22. The spacer of claim 21 wherein the width of the spacer decreases along the length radially outward from the first and second component discs.

* * * * *

UNITED STATES PATENT AND TRADEMARK OFFICE
CERTIFICATE OF CORRECTION

PATENT NO. : 5,242,036

DATED : September 7, 1993

INVENTOR(S) : David R. Hennessy et al.

It is certified that error appears in the above-identified patent and that said Letters Patent is hereby corrected as shown below:

Column 1, line 20, after "shaft" insert --.--.

Column 1, line 62, after "apparatus" insert --.--.

Column 6, line 10, cancel "ca" and substitute therefor --can--.

Column 7, line 38, after "semicircle" insert --.--.

Column 9, line 57, cancel "components" and substitute therefor --component--.

Column 10, line 39, after "flange" insert --,--.

Column 11, line 53, cancel "the".

Signed and Sealed this

Twenty-ninth Day of March, 1994

Attest:

BRUCE LEHMAN

Attesting Officer

Commissioner of Patents and Trademarks